Nov. 9, 1965          L. C. CHOUINGS ETAL          3,216,534
         AUTOMATIC ADJUSTING DEVICES FOR INTERNAL
               EXPANDING SHOE DRUM BRAKES
Filed Jan. 17, 1964                          5 Sheets-Sheet 3
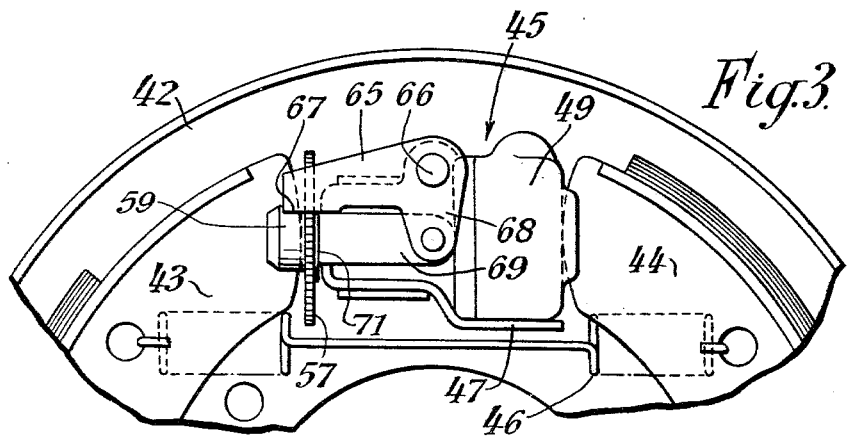
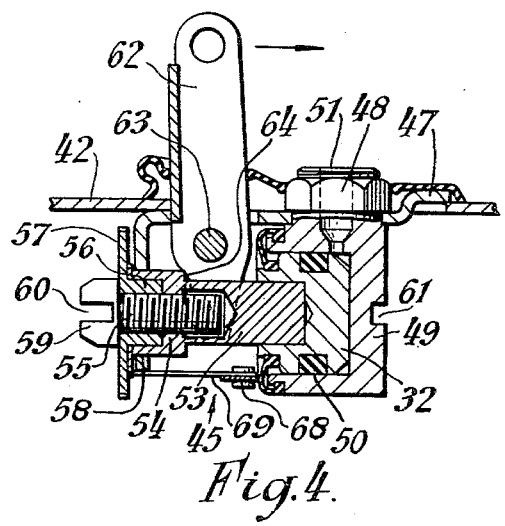
INVENTORS
Leslie C. Chouings
Wallace M. J. Cairns
BY
Winter, Day, Adams &
Tockman ATTORNEYS

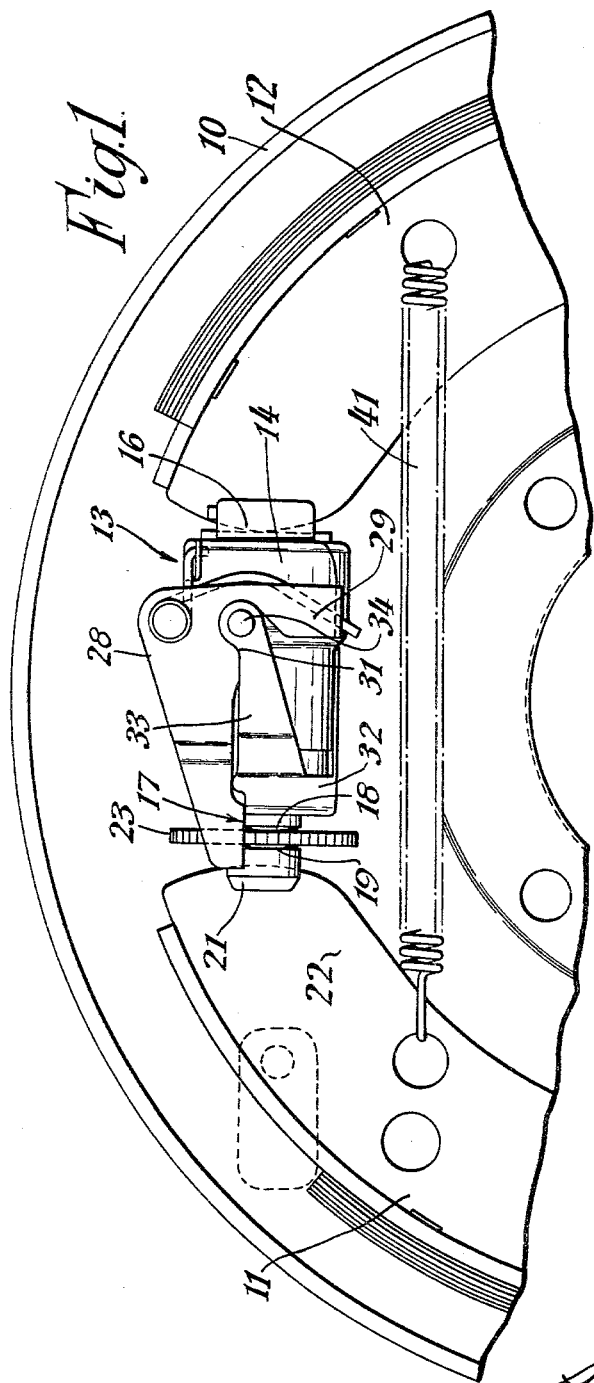

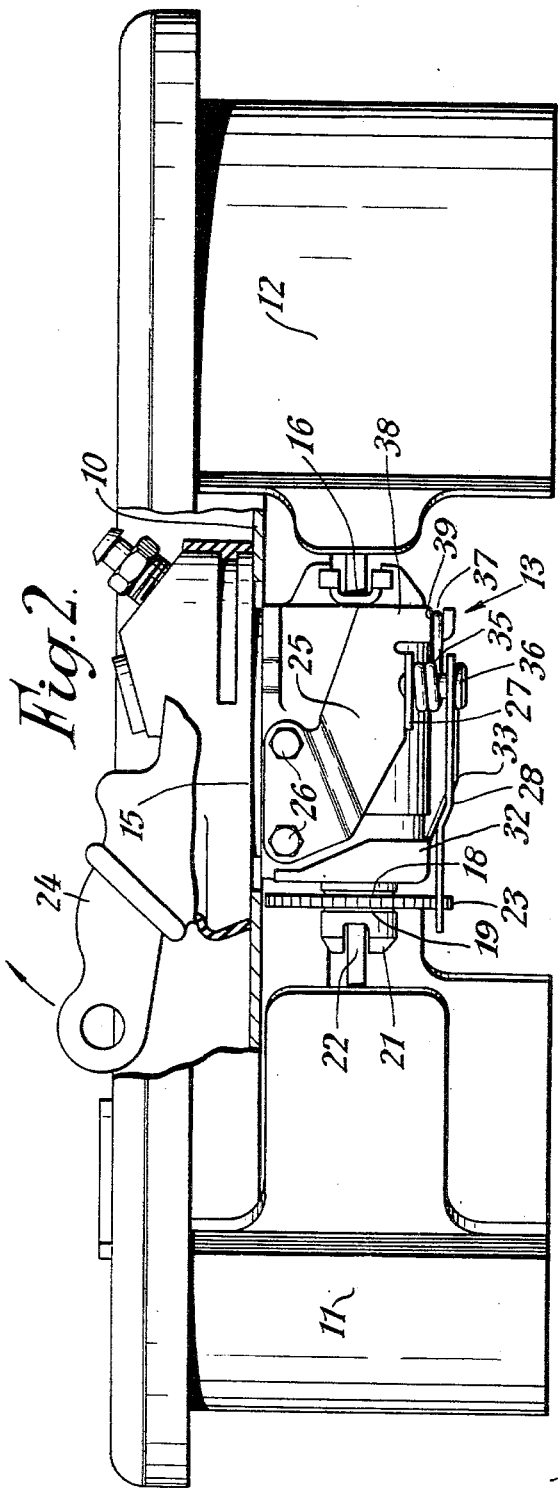

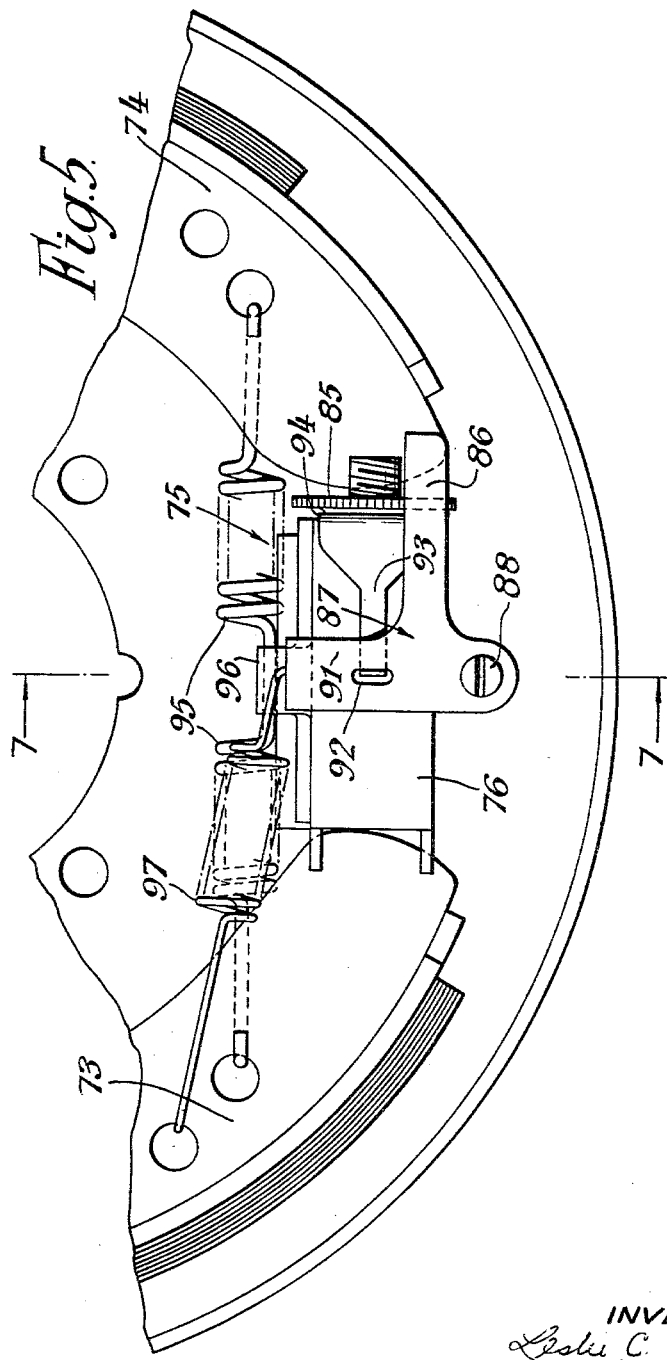

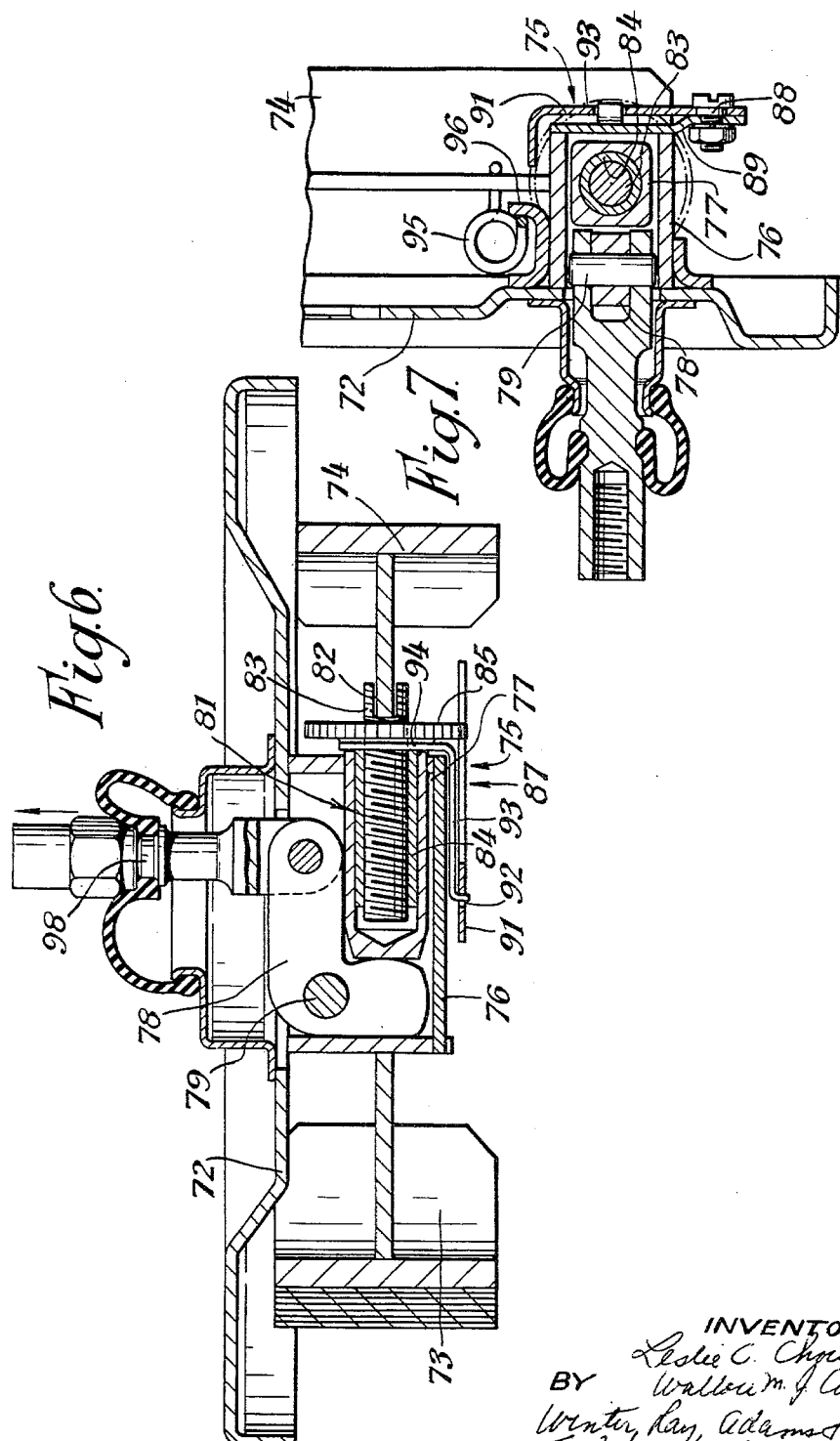

United States Patent Office 3,216,534
Patented Nov. 9, 1965

3,216,534
AUTOMATIC ADJUSTING DEVICES FOR INTERNAL EXPANDING SHOE DRUM BRAKES
Leslie C. Chouings and Wallace M. J. Cairns, both of Leamington Spa, England, assignors to Automotive Products Company Limited, Leamington Spa, England
Filed Jan. 17, 1964, Ser. No. 338,398
Claims priority, application Great Britain, Jan. 17, 1963, 2,151/63; July 2, 1963, 26,240/63
9 Claims. (Cl. 188—79.5)

This invention relates to automatic adjusting devices for internal expanding shoe drum brakes of the kind in which a shoe expanding mechanism is provided comprising a thrust member which acts on one shoe to urge it outwardly towards the drum, a reaction member which is either fixed to the brake support or movable to apply an outward thrust to the other shoe, and means to apply a thrust to the thrust member and a simultaneous reaction thrust to the reacion member, the thrust member being formed in two parts interconnected by screw threads so that its length can be altered by rotating one part relative to the other, and means being provided for automatically rotating said one part when the shoe movement to apply the brakes exceeds a predetermined amount.

It is the object of the present invention to provide a compact and reliable automatic adjusting device of the kind referred to.

According to the present invention, an automatic adjusting device of the kind referred to and comprising a pawl pivoted on the reaction member and co-operating with a toothed wheel on one of the parts of the thrust member to rotate said part relative to the other part thereof in one direction and means to actuate the pawl with a stroke which varies with the degree of movement of the brake shoes required to apply them to the drum, is characterised in that motion is transmitted to the pawl by a part comprising a ring surrounding the thrust member and engaging an abutment surface moving with the said thrust member, and a longitudinally extending arm co-operating with the pawl to move it about its pivot.

The longitudinally extending arm may carry a follower member engaging with a cam edge on the paw to effect movement of the said pawl.

Alternatively the longitudinally extending arm may be pivotally connected to the pawl or the pawl may be constituted by one arm of a three-armed lever pivoted at the end of a second arm and having a slot in the third arm engaged by the longitudinally extending arm in such a way that movement of the said longitudinally extending arm accompanying axial movement of the thrust member rotates the three-armed lever about its pivot.

The invention is hereinafter described with reference to the accompanying drawings, in which:

FIGURE 1 is a view in elevation of one form of automatic adjusting device according to the invention;

FIGURE 2 is a plan view of the adjusting device shown in FIGURE 1;

FIGURE 3 is an elevation, similar to FIGURE 1, showing another form of automatic adjusting device according to the invention;

FIGURE 4 is a plan view, partly in section, of the adjusting device shown in FIGURE 3;

FIGURE 5 is an elevation, similar to FIGURE 1, showing another form of automatic adjusting device according to the invention;

FIGURE 6 is a plan view, partly in section, of the adjusting device shown in FIGURE 5;

FIGURE 7 is a transverse section of the adjusting device on the line 7—7 of FIGURE 5.

The expanding device may be operated mechanically or by fluid pressure, or both mechanically and by fluid pressure, the arrangement shown in FIGURES 1 and 2 and in FIGURES 3 and 4 being operated by fluid pressure for normal brake application and mechanically for parking purposes, whereas the arrangement shown in FIGURES 5 to 7 is operated only mechanically.

Referring to FIGURES 1 and 2, a brake backplate 10 has mounted on it two brake shoes 11 and 12 between adjacent ends of which is provided a shoe expanding device 13, whilst between the other pair of adjacent ends there is provided an abutment (not shown) relative to which the shoes can rock in the plane of the backplate and slide in a generally radial direction. The expanding device 13 comprises a liquid pressure cylinder 14 slidable in a slot 15 in the backplate and engaging at one end, at 16 with the brake shoe 12, a piston (not shown) slidable in the cylinder, a plunger (not shown) slidable in the cylinder so as to receive thrust from the piston, and a thrust member 17 comprising a sleeve part 18 abutting on the plunger and a stem part 19 extending into the sleeve part and having screw-threaded engagement therewith. The stem part 19 has a head 21 slotted diametrally to receive the web 22 of the brake shoe 11 and thus be held against rotation, and the sleeve part 18 has a toothed wheel 23 fixed to it. A lever 24, pivoted to the cylinder 14, bears against the plunger so that the latter can be moved outwardly by the said lever, or by liquid pressure acting in the cylinder, to exert an applying thrust on the shoe 11 through the thrust member 17, the cylinder 14 serving as a reaction member which applies the reaction of the said thrust to the shoe 12.

A bracket 25 secured to the cylinder 14 by bolts 26 has an upturned lug 27 on which is pivotally mounted a pawl 28 the free end of which co-operates with the toothed wheel 23. The pawl 28 has integral with it a tail 29 which extends transversely across the cylinder 14, and the pawl is formed with a cam edge 31. An annular cap-like member 32 fitting over the outer end of the plunger and fixed to the plunger in any suitable manner has integral with it an arm 33 extending longitudinally of the cylinder 14. The arm 33 carries a pin 34 co-operating with the cam edge 31 on the pawl 28 as will be described below.

A torsion spring 35 coiled around the pivot pin 36 for the pawl 28 has one of its ends engaged at 37 with a finger 38 projecting from the bracket 25 and its other end engaged with the tail 29 of the pawl, the engagement at 37 being maintained by entry of the spring end into a notch 39, and the arrangement at the other end being similar. The spring 35 acts primarily to take up backlash and urge the pawl 28 against the edge of the toothed wheel 23, but also provided a slight turning load tending to assist the pawl on its operative stroke.

The brake shoes 11 and 12 are drawn towards each other to disengage them from the brake drum by return springs one of which is shown at 41, their inward movement being limited by the total length, when the plunger is retracted, of the expanding device from the abutment of the brake shoe 12 on the cylinder at 16 to the abutment of the brake shoe 11 on the thrust member head 21. Thus increasing the length of the thrust member 17 reduces the inward movement of the shoes and enables the clearance between the shoes and the drum to be kept substantially constant as the shoe linings wear away.

The adjusting device described with reference to FIGURES 1 and 2 operates in the following manner. When the brake is applied, either by liquid pressure in the cylinder 14 or by the lever 24, the plunger and thrust member are moved outwardly of the cylinder 14, and the pin 34 rides along the cam edge 31, rocking the pawl 28 so that its operative edge slides over the teeth of the wheel 23 and, if the movement is sufficient, drops behind a tooth thereof. When the brakes are released the shoes 11 and 12 are drawn inwardly by the pull off springs, and the pin 34 rides back along the cam edge 31 into a notch in which it acts to rock the pawl positively in the opposite direction and rotate the toothed wheel to also rotate the sleeve 18 of the thrust member relative to the stem 19 hereof in a direction to increase the length of the said thrust member and so reduce the shoe clearance.

Referring now to FIGURES 3 and 4 of the drawings, the brake is of the same general type as that shown in FIGURES 1 and 2, comprising a backplate 42 on which are mounted two brake shoes 43 and 44 both engaging a fixed abutment at their ends which are not shown, and having an expanding device 45 between their ends which are shown on the drawing, which expanding device serves to determine the relative positions of the shoes when they are in the off position, the said shoes being drawn inwardly by return springs, one of which is shown at 46, extending between them.

The expanding device 45 comprises a slide member 47 located in a slot in the backplate 42 and having secured to it by a nut 48 a block 49 in which is formed a cylinder bore 50, the nut engaging with a screw-threaded spigot 51 integral with the block 49. A piston 52 slidable in the cylinder bore 50 is recessed to receive a co-axial and relatively movable rod 53 enlarged at its end remote from the piston and formed with a stepped bore 54 extending inwardly from that end. A screw-threaded stem 55 extending into the smaller part of the bore 54 is engaged by an internally screw-threaded sleeve 56 extending into the larger part of the bore and having a toothed wheel 57 fixed to its outer end. The stem 55 and sleeve 56 together constitute an adjustable thrust member. The enlarged end of the rod 53 is guided in a hole 58 in the slide member 47. The stem 55 has a head 59 which is slotted diametrally at 60 to receive the end of the web of the brake shoe 43, and the block 49 is slotted at 61 to receive the web of the brake shoe 44. A lever 62 pivoted at 63 on the slide member 47 and forked at its inner end to embrace the smaller part of the rod 53 is operable by a pull applied to its outer end to move the rod 53 relative to the slide member 47 by acting on the external shoulder 64 at the change of diameter of the said rod.

A pawl 65 pivoted at 66 on the slide member 47 has a nose 67 at one end to co-operate with the toothed wheel 57, and also has a lateral tail 68 to which is pivoted one end of a coupling member 69 the other end of which consists of a flat ring 71 lying between the outer end of the rod 53 and the toothed wheel 57 so that it moves to and fro with the rod 53.

The device operates substantially in the same manner as the previous embodiment.

FIGURES 5 to 7 show an embodiment of the invention which is associated with a mechanical shoe expanding device.

A backplate 72 supports a pair of brake shoes 73 and 74, the general arrangement being substantially the same as in the previously described embodiments, and the mechanical shoe expanding device is shown at 75. The shoe expanding device comprises a housing 76 slidably mounted on the backplate 72, a plunger 77 of rectangular cross-section slidably mounted in the housing, an applying lever 78 in the form of a bell-crank pivoted at 79 in the housing and acting on the inner end of the plunger, and an adjustable thrust member 81 acted on by the plunger 77. The housing 76 thus constitutes a reaction member taking the reaction of thrust applied to the plunger 77 by the lever 78. The end of the brake shoe 73 abuts against one end of the housing 76, and the end of the brake shoe 74 enters and abuts against the bottom of a diametral slot 82 in the outer end of a screw-threaded stem 83 forming one part of the adjustable thrust member 81, the other part of the said thrust member being a sleeve 84 into which the stem 83 is screwed, the said sleeve 84 having fixed to it a toothed wheel 85. The engagement of the web of the shoe 74 in the slot 82 holds the stem 83 against rotation so that, by rotating the sleeve 84 the length of the thrust member can be increased.

The toothed wheel 85 is engaged by a pawl 86 constituting one arm of a T-shaped lever 87 pivoted at 88 on a lug 89 projecting from the housing 76. The third arm 91 of the lever is slotted as shown at 92 and in the said slot is engaged the turned-up end of an arm 93 integral with a ring 94 surrounding the sleeve 84 and bearing on the outer end of the plunger 77. A brake-shoe return spring 95 extending between the brake shoes 73 and 74 engages, as shown in FIGURE 7, in a channel member 96 fixed to the housing 76, so as to assist in locating the said housing. A further spring 97 connected between the arm 91 of the lever 87 and the brake shoe 73 acts on the said lever 87 to take up any lost motion between the said lever and the arm 93.

It will be apparent that operation of the applying lever 78, by, for example, a pull rod connected to the fitting 98, will push the plunger 81 outwardly of the housing 76, and a reaction thrust will be exerted on the housing, which will be transmitted to the shoe 73, so that both shoes will be applied to the brake drum. The arm 93 will apply a pull to the arm 91 of the lever 87 tending to rotate the said lever about its pivot at 88 and move the pawl 86 idly over the teeth of the wheel 85. If the movement is sufficient to cause the pawl 86 to move into engagement with a fresh tooth of the wheel 85 the said wheel will be rotated when the shoes are retracted, due to the inward movement of the plunger and the pull of the spring 97.

We claim:

1. An automatic adjusting device for a brake comprising brake shoe members, brake actuating means for said shoe members including a thrust member disposed for movement in a direction toward one of said brake shoe members to apply a brake action, a threaded stem member threadably engaging said thrust member, a toothed wheel fixed to said thrust member, a bracket member fixed to said actuating means, a pivot pin carried by said bracket member, a pawl pivotally mounted on said pin and having its opposite end adapted to engage said thrust member toothed wheel, an arm fixed at one end to said thrust member and movable therewith, a follower pin disposed on the other end of said arm, cam means on said pawl, and said follower pin disposed to ride along said cam means to pivot said pawl about said pivot pin to move said stem member relative to said thrust member to increase the overall length of said stem and thrust member to adjust said brakes.

2. The device of claim 1 wherein said pawl and arm extend parallel to each other and the pawl is pivotally connected at its end adjacent the follower pin on said arm.

3. The device of claim 2 wherein said device is unattached to said shoe members and is operatively connected to said brake shoe members by slot means only disposed to abut said shoe members.

4. An automatic adjusting device for a brake comprising a pair of spaced brake shoe members, a back plate, brake actuating means fixed to said back plate including a movable thrust rod disposed for movement in a direction toward one of said brake shoe members, a slide fixed to said actuating means, a threaded stem extending into said rod, a toothed wheel sleeve threaded on said stem, an annular ring carried by said slide through which said toothed wheel sleeve extends, said ring disposed between an enlarged circular portion of said wheel sleeve and one end of said rod, said rod extending through an opening in said slide, an arm with one end fixed to move with said ring, said sleeve and ring being disposed to move with said rod, a pawl pivoted on said slide and adapted to engage said toothed wheel sleeve, said arm having its other end pivotally connected to said pawl to move said pawl.

5. The device of claim 4 wherein said pawl and arm extend parallel to each other and have their adjacent ends pivotally connected.

6. The device of claim 4 wherein a bifurcated lever member is pivotally connected to said slide and is disposed to move said rod in the direction toward one of said brake shoe members.

7. The device of claim 6 wherein said device is unattached to said shoe members and operatively connected to said shoe members by slot means only.

8. An automatic adjusting device for a brake comprising a pair of spaced brake shoe members, a back plate, brake actuating means fixed to said back plate including a movable thrust rod disposed for movement in a direction toward one of said brake shoe members, a threaded stem extending into said rod and threadably engaged therewith, a toothed wheel fixed to said stem, an arm extending longitudinally of said stem and fixed at one end to said stem and wheel for movement therewith, a pawl pivotally connected to said actuating means having one leg adapted to engage said wheel and another leg engaged by said arm end opposite said one arm end for rocking said pawl about its pivot point.

9. The device of claim 8 wherein said pawl legs are approximately at right angles to each other and said actuating means are unattached to said shoe members and are operatively connected to said shoe members by slotted means only.

References Cited by the Examiner
UNITED STATES PATENTS

| | | | |
|---|---|---|---|
| 2,221,090 | 11/40 | Goepfrich | 188—79.5 |
| 2,224,197 | 12/40 | Schlueter | 188—79 |
| 2,389,618 | 11/45 | Goepfrich | 188—79.5 |

FERGUS S. MIDDLETON, *Primary Examiner.*

DUANE A. REGER, ARTHUR L. LA POINT,
*Examiners.*